United States Patent
Kim

(10) Patent No.: US 8,558,910 B2
(45) Date of Patent: Oct. 15, 2013

(54) METHOD AND APPARATUS FOR DETECTING RED EYES

(75) Inventor: Seung-hun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 358 days.

(21) Appl. No.: 12/948,995

(22) Filed: Nov. 18, 2010

(65) Prior Publication Data

US 2011/0122279 A1    May 26, 2011

(30) Foreign Application Priority Data

Nov. 20, 2009    (KR) .................. 10-2009-0112787

(51) Int. Cl.
- *H04N 5/228* (2006.01)
- *H04N 5/217* (2011.01)
- *G06K 9/00* (2006.01)

(52) U.S. Cl.
USPC .......... 348/222.1; 348/241; 382/117; 382/167

(58) Field of Classification Search
USPC ........ 348/207.99, 216.1, 220.1, 221.1, 229.1, 348/230.1, 239, 241, 333.12, 370, 371; 382/117, 167, 173, 181, 190, 209, 254, 382/272, 273, 274, 275
See application file for complete search history.

(56) References Cited

U.S. PATENT DOCUMENTS

| | | | | |
|---|---|---|---|---|
| 6,009,209 A | * | 12/1999 | Acker et al. | 382/275 |
| 7,852,377 B2 | * | 12/2010 | Wu | 348/222.1 |
| 8,106,958 B2 | * | 1/2012 | Takahashi | 348/222.1 |
| 8,331,666 B2 | * | 12/2012 | Levy et al. | 382/167 |
| 2003/0202105 A1 | * | 10/2003 | Gaubatz et al. | 348/207.99 |
| 2004/0141657 A1 | | 7/2004 | Jarman | |
| 2004/0213476 A1 | * | 10/2004 | Luo et al. | 382/254 |
| 2004/0228542 A1 | | 11/2004 | Zhang et al. | |
| 2008/0112613 A1 | | 5/2008 | Luo et al. | |
| 2008/0170778 A1 | | 7/2008 | Luo | |

FOREIGN PATENT DOCUMENTS

JP    2007-097178 A    4/2007

* cited by examiner

*Primary Examiner* — Tuan Ho
*Assistant Examiner* — Peter Chon
(74) *Attorney, Agent, or Firm* — Drinker Biddle & Reath LLP

(57) ABSTRACT

A method of detecting a red eye is provided that includes determining an eye area from an input image, obtaining a pixel having the maximum redness from the eye area, generating a first mask area having a predetermined size including the pixel from the eye area, obtaining an average of image data from pixels in the first mask area, obtaining red-eye pixels corresponding to the image data average from the eye area, and determining a red-eye area by using the red-eye pixels.

32 Claims, 16 Drawing Sheets

METHOD AND APPARATUS FOR DETECTING RED EYES

CROSS-REFERENCE TO RELATED PATENT APPLICATIONS

This application claims the benefit of Korean Patent Application No. 10-2009-0112787, filed on Nov. 20, 2009, in the Korean Intellectual Property Office, the disclosure of which is incorporated herein in its entirety by reference.

BACKGROUND

The invention relates to a method and apparatus for detecting red eyes.

In general, a red-eye effect in photography is the common appearance of red pupils in color photos of eyes and commonly occurs when a person or animal is photographed by using a flash of a compact digital camera, for example, in a dimly lit surrounding. The red-eye effect is generally generated as the light of a flash, for example, suddenly passes through a pupil that is open wide to see an object in ambient low light, and is reflected at the back of the eyeball. The red-eye effect is particularly recognized by a digital camera using a flash, not by a photographer, and needs a correction process.

SUMMARY

To solve the above and/or other problems, the invention provides a method and apparatus for detecting red eyes quickly and reliably to effectively correct a red-eye effect.

According to an embodiment of the invention, a method of detecting a red eye includes determining an eye area from an input image, obtaining a pixel having a maximum redness from the eye area, generating a first mask area having a predetermined size including the pixel from the eye area, obtaining an average of image data from pixels in the first mask area, obtaining red-eye pixels corresponding to the image data average from the eye area, and determining a red-eye area by using the red-eye pixels.

According to another embodiment of the invention, a method of detecting a red eye includes determining an eye area from an input image, obtaining redness by using Equation 1, that is, $$\text{Redness}=(r-b)\times(r-g)\times(r+b-g)/[(g+b)\times(g+b)+1],$$

with respect to a pixel of the eye area, in which "r", "g", and "b", respectively, denote R, G, B image data of pixels, obtaining red-eye pixels corresponding to a reference redness from the eye area, and obtaining a red-eye area by using the red-eye pixels.

According to another embodiment of the invention, an apparatus for detecting a red eye includes an eye determination unit for determining an eye area from an input image, a redness obtaining unit for obtaining redness by using Equation 1, $$\text{Redness}=(r-b)\times(r-g)\times(r+b-g)/[(g+b)\times(g+b)+1],$$

with respect to a pixel of the eye area, in which "r", "g", and "b", respectively, denote R, G, B image data of the pixel, a red-eye area obtaining unit for obtaining a red-eye area including red-eye pixels corresponding to a reference redness from the eye area.

According to another embodiment of the invention, an apparatus for detecting a red eye includes an eye area determination unit for determining an eye area from an input image, a maximum redness pixel obtaining unit for obtaining a pixel having the maximum redness from the eye area, a first mask area generation unit for generating a first mask area having a predetermined size including the pixel from the eye area, an image data average obtaining unit for obtaining an average of image data from pixels in the first mask area, a red-eye pixel obtaining unit for obtaining a red-eye pixel corresponding to the image data average from the eye area, and a red-eye area determination unit for determining a red-eye area by using the red-eye pixel.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
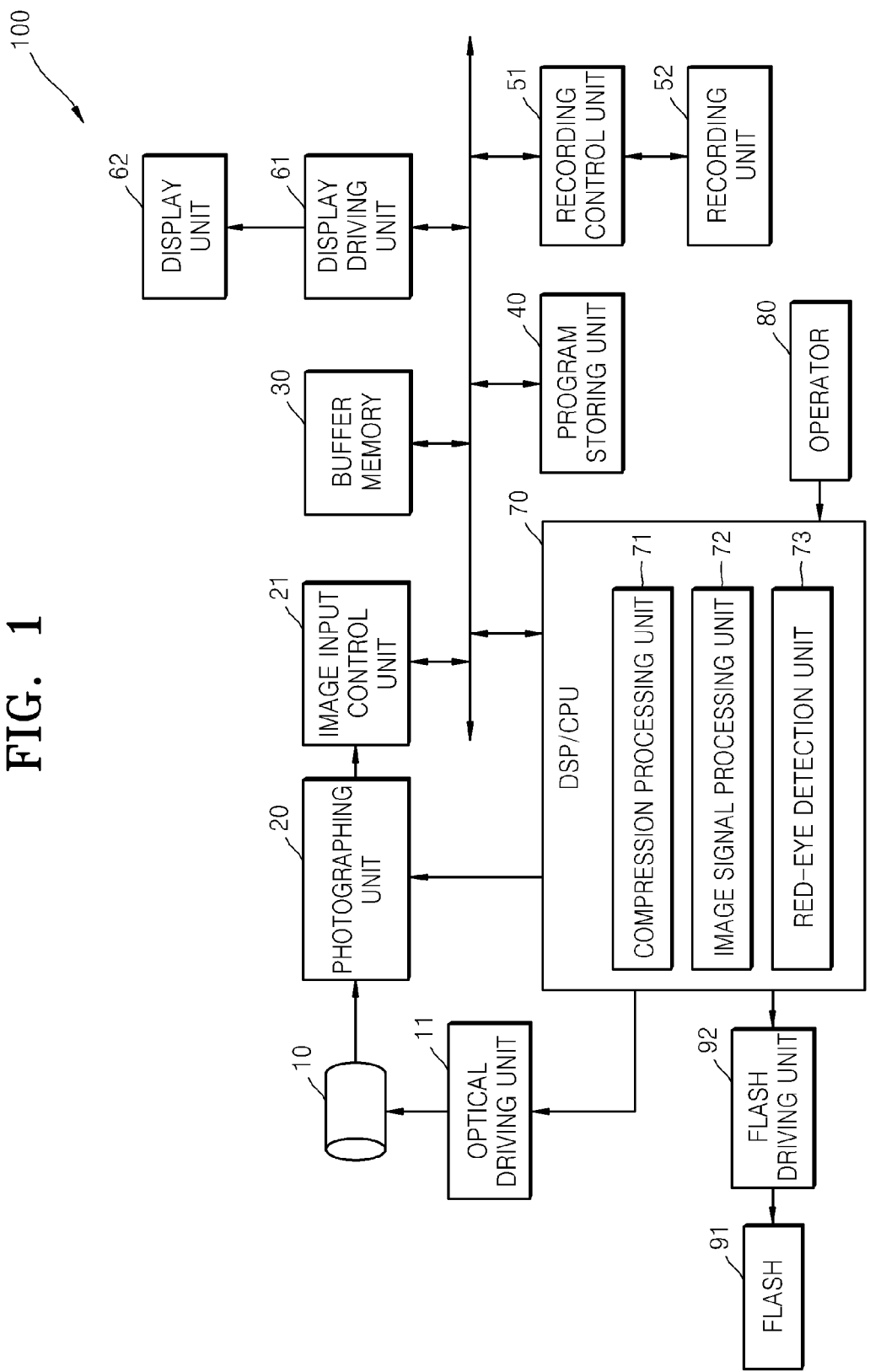
FIG. 1 is a block diagram of a digital camera as an example of a red-eye detection apparatus, according to an exemplary embodiment of the invention.

The attached drawings for illustrating exemplary embodiments of the invention are referred to in order to gain a sufficient understanding of the invention, the merits thereof, and the objectives accomplished by the implementation of the invention. Hereinafter, the invention will be described in detail by explaining exemplary embodiments of the invention with reference to the attached drawings. Like reference numerals in the drawings denote like elements.

FIG. 1 is a block diagram of a digital camera as an example of a red-eye detection apparatus, according to an exemplary embodiment of the invention. Although in the present exemplary embodiment a digital camera is used as an example as the red-eye detection apparatus, the invention is not limited thereto and the red-eye detection apparatus may be digital devices such as video cameras, personal digital assistants (PDAs), televisions, digital photo frames, cellular phones, or portable multimedia players (PMPs).

Referring to FIG. 1, the digital camera includes an optical unit 10, a photographing unit 20, a buffer memory 30, a program storing unit 40, a recording control unit 51, a recording unit 52, a display driving unit 61, a display unit 62, a digital signal processor (DSP)/central processing unit (CPU) 70, and an operation unit 80.

The optical unit 10 may include a lens for focusing an optical signal, an aperture for regulating the quantity of the optical signal or light, and a shutter for controlling the input of the optical signal. The lens may include a zoom lens for increasing or decreasing a viewing angle according to a focal length, and a focus lens for focusing an object. These lenses may be formed of separate lenses or a group of a plurality of lenses. A mechanical shutter in which shutter blades move up and down may be provided as the shutter. Instead of a separate shutter device, the supply of an electric signal to the photographing unit 20 may be controlled to perform as the shutter.

An optical driving unit 11 may drive the location of the lenses, the opening/closing of the aperture, or the operation of the shutter in order to perform autofocus, automatic exposure control, aperture adjustment, zooming, or change of focus. The optical driving unit 11 receives a control signal from the DSP/CPU 70 to drive the optical unit 10.

The photographing unit 20 includes a photoelectric conversion device that receives an optical signal input through the optical unit 10 and converts the received optical signal to an electric signal. A charge coupled device (CCD) sensor array or a complementary metal oxide semiconductor (CMOS) sensor array may be used as the photoelectric conversion device. Also, the photographing unit 20 includes a correlated double sampling/amplifier (CDS/AMP) (not shown) and an analog to digital (A/D) converter (not shown). The CDS/AMP removes low frequency noise included in the electric signal output from the CCD and simultaneously amplifies the electric signal to a particular level. The A/D converter digitally converts the electric signal output from the CDS/AMP to generate a digital signal. The A/D converter outputs a generated digital signal to an image input control unit 21.

The photographing unit 20 may be controlled according to a timing signal supplied by the DSP/CPU 70. A timing generator TG (not shown) outputs the timing signal to the photographing unit 20 to control the exposure time of each pixel of the photoelectric conversion device, or the reading of electric charges. Thus, the photographing unit 20 may provide image data corresponding to an image of a frame according to the timing signal provided from the TG.

The buffer memory 30 temporarily stores image data of a photographed image. The buffer memory 30 may memorize image data of a plurality of images and output an image signal by maintaining, in order, the image signals during focus control. The reading or writing with respect to the image input control unit 21 may be controlled. Also, the buffer memory 30 may include an image display memory having at least one channel. The input and output of the image data from the buffer memory 30 to the display driving unit 61 may be simultaneously performed. The resolution of the display unit 62 or the maximum number of colors displayable on the display unit 62 is dependent upon the capability of the image display memory.

The program storing unit 40 may store an operating system (OS) or application programs needed to operate the digital camera. An E2PROM, a flash memory, or a read only memory (ROM) may be used as the program storing unit 40.

The recording control unit 51 controls recording of the image data in the recording unit 52, or reading out of the image data or setting information recorded on the recording unit 52. The recording unit 52 may incorporate, for example, optical discs (CDs, DVDs, or blu-ray discs), optomagnetic discs, magnetic discs, or semiconductor memory media and may record the photographing image data. The recording control unit 51 and the recording unit 52 may be detachable from the digital camera.

The display driving unit 61 drives the display of various setting screens or an image corresponding to the photographed image data on the display unit 62. The image data may be the representation of the image recorded on the recording unit 52 or provided from the buffer memory 30 in real time. Display devices such as a liquid crystal display (LCD), an organic light emitting diode (OLED), a plasma display panel (PDP), or an electronic display device (EDD) may be used as the display unit 62.

The DSP/CPU 70 is an operation processing apparatus and control apparatus and controls the process of respective constituent elements of the digital camera. The DSP/CPU 70, for example, outputs a control signal to the optical driving unit 11 and drives the optical unit 10 based on the focus control or exposure control. Also, the DSP/CPU 70 controls the constituent elements of the digital camera based on the signal from the operation unit 80. In the present exemplary embodiment, although only one DSP/CPU 70 is provided, the DSP/CPU 70 may be configured to include a plurality of CPUs executing commands from a signal system and commands from an operation system on the respective CPUs.

The DSP/CPU 70 includes a compression processing unit 71, an image signal processing unit 72, and a red-eye detection unit 73. The compression processing unit 71 receives an image signal before compression processing and compresses the received image signal in a compression format, for example, a JPEG compression format or a Lempel-Ziv-Welch (LZW) compression format. The image signal processing unit 72 reduces noise of input image data and may perform image signal processing such as gamma correction, color filter array interpolation, color matrix, color correction, or color enhancement. The red-eye detection unit 73 detects red eyes from an input image. The detection of red eyes will be detailed below with reference to the accompanying drawings.

The operation unit 80 may include members for operating the digital camera or inputting various settings for photography by a photographer. For example, the operation unit 80 may be implemented in the form of a button, a key, a touch panel, a touch screen, or a dial, so as to input photographer's operation signals for power on/off, photography start/stop, reproduction start/stop/search, optical system driving, mode change, menu operation, or selection operation. For example, a shutter button may be half pressed, fully pressed, or released by the photographer. When being half pressed (S1 operation), the shutter button outputs a focus control start operation signal. The focus control is terminated as the half press is released. When being fully pressed (S2 operation), the shutter button outputs a photography start operation signal. The operation signal is transmitted to the DSP/CPU 70 and may drive a corresponding constituent element.

Also, the digital camera may include a flash (not shown) that generates a red-eye effect and a flash driving unit (not shown). The flash may be formed of a light emitting diode (LED). The flash driving unit may control the quantity and speed of light of the LED in a pulse-with modulation (PWM) driving method.

Figure 2:
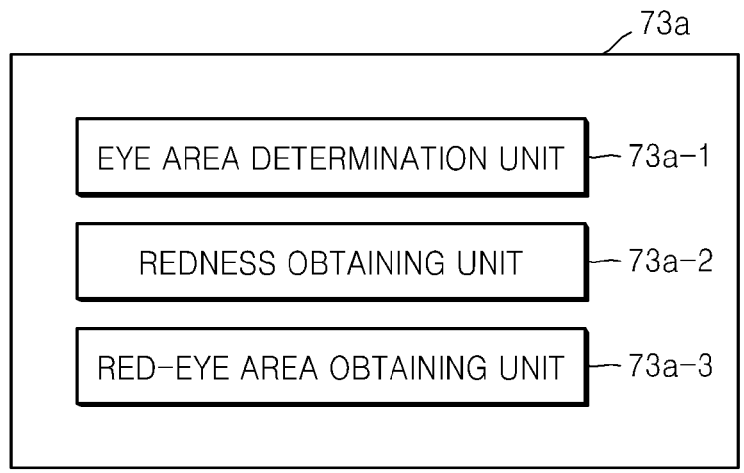
FIG. 2 is a block diagram of a red-eye detection unit of the digital camera of FIG. 1, according to an exemplary embodiment of the invention.

FIG. 2 is a block diagram of a red-eye detection unit 73a of the digital camera of FIG. 1, according to an exemplary embodiment of the invention. Referring to FIG. 2, the red-eye detection unit 73a includes an eye area determination unit 73a-1 for determining an eye area in an input image, a redness obtaining unit 73a-2 for obtaining redness of pixels of an eye area according to Equation 1, and a red-eye area obtaining unit 73a-3 for obtaining a red-eye area including red-eye pixels corresponding to a reference redness from the eye area.

$$\text{Redness} = (r-b) \times (r-g) \times (r+b-g) / [(g+b) \times (g+b) + 1] \quad (1)$$

In Equation 1, "r", "g", and "b", respectively, denote R, G, B image data of pixels forming the input image. According to Equation 1, the most highly reliable red-eye area may be obtained from a determined eye area.

The red-eye detection unit 73a may further include a highlight area obtaining unit (not shown). The eye area determination unit 73a-1 may detect a face area using a face detection algorithm of an input image and recognize and determine an eye area by detecting an image pattern and color of a detected face area. However, when the detection of a face or an eye area fails, the highlight area obtaining unit is provided to determine the eye area. Although it is not illustrated in the present exemplary embodiment, a face area detection unit and a highlight area obtaining unit of the below-described exemplary embodiments may further be provided.

The highlight area obtaining unit may include a highlight segment obtaining unit for obtaining a highlight horizontal segment and a highlight vertical segment and a highlight area determination unit for determining a highlight area including the highlight horizontal segment and the highlight vertical segment.

Also, the highlight area obtaining unit may further include a comparison unit for comparing a pixel of a highlight segment and a surrounding pixel, in detail, comparing a first difference in red image data between a first pixel of a start point or an end point of at least one segment of the highlight horizontal segment and the highlight vertical segment and a second pixel located two pixels before the first pixel in a scanning direction, and a second difference in the green image data or blue image data between the first pixel and the second pixel. When the first difference in the red image data is smaller than the second difference in the green image data or blue image data, the highlight area determination unit may determine that the at least one segment belongs to the highlight area. That is, to be included in the highlight area in a red eye, it is required that the first difference be smaller than the second difference. Also, as another comparison method, the first difference may be compared with a first reference that is determined from experience and the second difference may be compared with a second reference that is previously determined. The first reference should be smaller than the second reference.

The highlight area obtaining unit may further include a highlight segment size comparison unit for comparing a size of at least one segment of the highlight horizontal segment and the highlight vertical segment and the range of a reference segment size. When the size of the at least one segment corresponds to the reference segment range, the highlight area determination unit may determine that the at least one segment belongs to the highlight area. For example, if the size of the obtained highlight horizontal segment or highlight vertical segment is greater than the horizontal or vertical size of the input image, the horizontal or vertical size of the detected face area, or the horizontal or vertical size of the determined eye area, it is difficult to say that the obtained size is the highlight area in a red eye.

Figure 3:
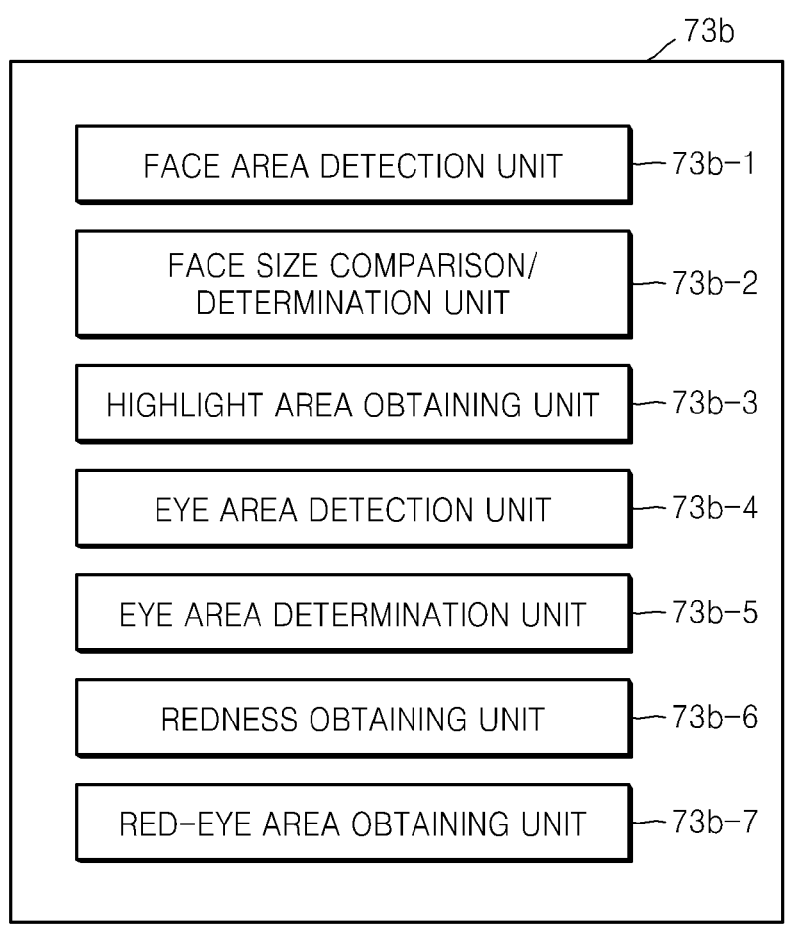
FIG. 3 is a block diagram of a red-eye detection unit of the digital camera of FIG. 1, according to another exemplary embodiment of the invention.

FIG. 3 is a block diagram of a red-eye detection unit 73b of the digital camera of FIG. 1, according to another exemplary embodiment of the invention. Referring to FIG. 3, the red-eye detection unit 73b may include an eye area determination unit 73b-5 for determining an eye area from an input image and a red-eye area obtaining unit 73b-7 for obtaining a red-eye area from the eye area.

Figure 4:
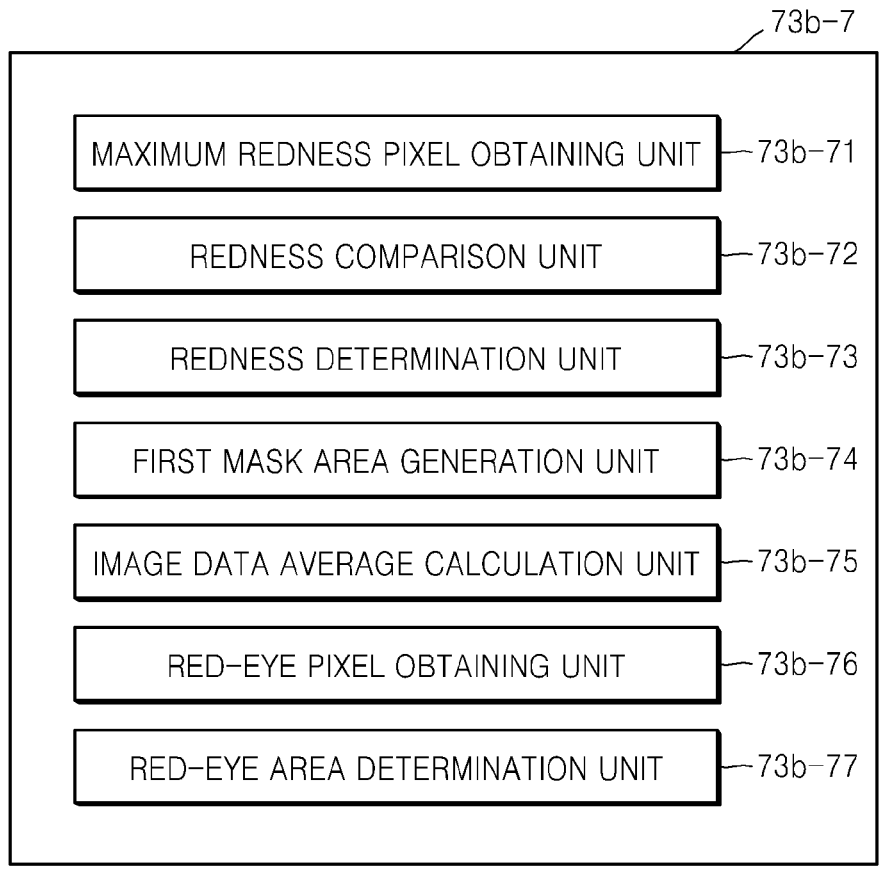
FIG. 4 is a block diagram of a red-eye area obtaining unit of the red-eye detection unit of FIG. 3, according to an exemplary embodiment of the invention.

FIG. 4 is a block diagram of a red-eye area obtaining unit 73b-7 of the red-eye detection unit of FIG. 3, according to an exemplary embodiment of the invention. Referring to FIG. 4, the red-eye area obtaining unit 73b-7 includes a maximum redness pixel obtaining unit 73b-71 for obtaining a pixel having the maximum redness from the eye area, a first mask area generation unit 73b-74 for generating a first mask area having a predetermined size, including the pixel having the maximum redness, in the eye area, an image data average calculation unit 73b-75 for calculating an average of the image data from the pixels in the first mask area, a red-eye pixel obtaining unit 73b-76 for obtaining red-eye pixels corresponding to the average of the image data from the eye area, and a red-eye area determination unit 73b-77 for determining a red-eye area by using the obtained red-eye pixels. The red-eye pixel obtaining unit 73b-76 may obtain pixels having image data existing within a range of (the average of the image data)±a, as the red-eye pixels. The "a" may be a predetermined value obtained from experience. The red-eye area determination unit 73b-77 may determine an area including the obtained red-eye pixels as the red-eye area.

Figure 5:
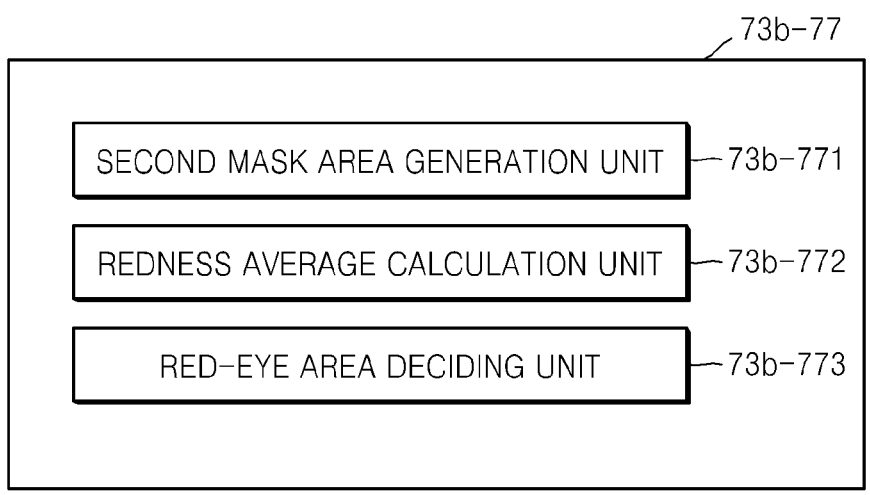
FIG. 5 is a block diagram of a red-eye area determination unit of the red-eye detection unit of FIG. 4, according to an exemplary embodiment of the invention.

FIG. 5 is a block diagram of the red-eye area determination unit 73b-77 of the red-eye detection unit of FIG. 4, according to an exemplary embodiment of the invention. Referring to FIG. 5, the red-eye area determination unit 73b-77 may include a second mask area generation unit 73b-771 for generating a second mask area including the red-eye pixels, a redness average calculation unit 73b-772 for calculating an average of redness of pixels in the second mask area while moving the second mask area, and a red-eye area deciding unit 73b-773 for deciding the second mask area having the highest average as the red-eye area.

Referring back to FIG. 4, the red-eye area obtaining unit 73b-7 may further include a redness comparison unit 73b-72 for comparing the maximum redness with a reference redness, and a redness determination unit 73b-73 for determining that no red-eye area exists when the maximum redness is smaller than the reference redness. The maximum redness pixel obtaining unit 73b-71 may obtain a pixel having the maximum redness in the eye area when the maximum redness is greater than the reference redness.

The redness may be obtained by Equation 1. R, G, and B image data may be used to obtain the redness. Thus, as the R, G, and B image data provided by the photographing unit 20 are used without change, a processing speed may be increased. However, although in the present exemplary embodiment the R, G, and B image data are in used, the invention is not limited thereto and Y, Cb, and Cr image data may be used instead.

Referring back to FIG. 3, the red-eye detection unit 73b may further include a face area detection unit 73b-1 for detecting a face area by using the face detection algorithm from the input image. Also, the red-eye detection unit 73b may further include an eye area detection unit 73b-4 for detecting an eye area by using an eye detection algorithm from the face area.

The face area and the eye area may be detected by using image pattern or color information. The face area and the eye area may be detected by comparing the input image with predetermined face information and eye information.

Also, the red-eye detection unit 73b may further include a face area comparison/determination unit 73b-2 for comparing a size of the detected face area with a reference size. An eye area may be detected from the face area according to the size of a face. For example, when the size of a face is smaller than the reference size, the eye area detection unit 73b-4 may detect an eye from the face area by using an eye recognition algorithm and the eye area determination unit 73b-5 may determine an area including the detected eye as the eye area. When the size of a face is greater than the reference size, the red-eye detection unit 73b may further include a highlight area obtaining unit 73b-3 for obtaining a highlight area and the eye area determination unit 73b-5 may determine an area including the highlight area as the eye area.

When the face area detection unit 73b-1 does not detect the face area, the red-eye detection unit 73b may include the highlight area obtaining unit 73b-3 for obtaining the highlight area. The eye area determination unit 73b-5 may determine an area including the highlight area as the eye area.

Figure 6:
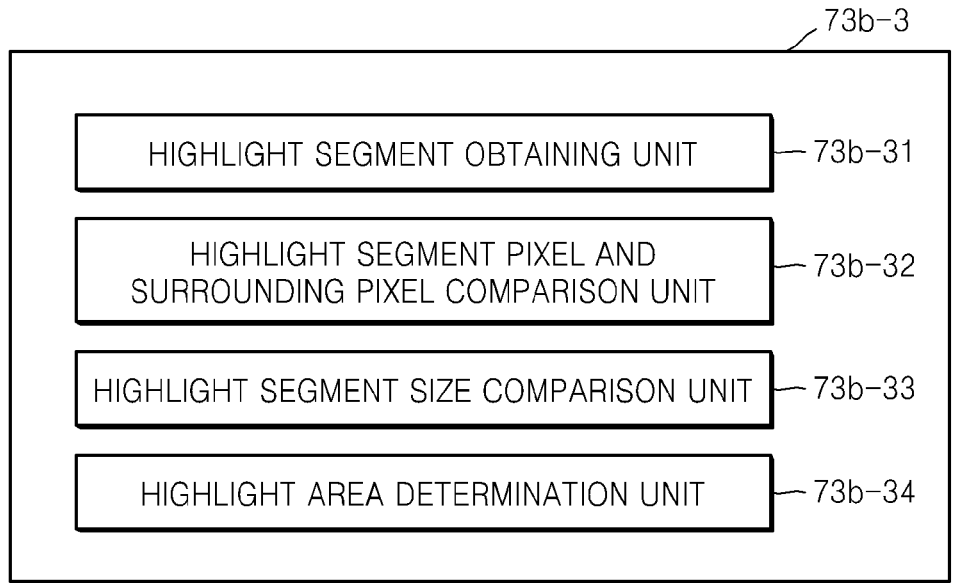
FIG. 6 is a block diagram of a highlight area obtaining unit of the red-eye detection unit of FIG. 3, according to an exemplary embodiment of the invention.

The highlight area obtaining unit 73b-3 will be described in detail with reference to FIG. 6. FIG. 6 is a block diagram of the highlight area obtaining unit 73b-3 of the red-eye detection unit 73 of FIG. 3, according to an exemplary embodiment of the invention. The highlight area obtaining unit 73b-3 includes a highlight segment obtaining unit 73b-31 for obtaining a highlight horizontal segment and a highlight vertical segment and a highlight area determination unit 73b-34 for determining a highlight area including the highlight horizontal segment and the highlight vertical segment.

The highlight segment obtaining unit 73b-31 may determine whether a current pixel is very bright white by checking brightness pixels of the input image along a horizontal axis and a vertical axis. The highlight area is much brighter than the white of an eye. Equation 2 or 3 may be used as a conditional expression for the determination. When the image data of each pixel is R, G, and B data, Equation 2 may be used. When the image data of each pixel is Y, Cb, and Cr data, Equation 3 may be used.

$$r+g+b>t\_rgb$$

$$|r-g|+|g-b|+|r-b|<t\_diff$$

$$t\_rgb=612$$

$$t\_diff=96 \qquad (2)$$

In Equation 2, "r", "g", and "b" respectively denote R, G, and B image data of a pixel in an input image. The "t_rgb" is a reference of the sum of the R, G, and B image data to correspond to the highlight area. The "t_diff" is a reference of the sum of differences between the R, G, and B image data to correspond to the highlight area. The "t_rgb" and "t_diff" are adjustable values.

$$Y>t\_Y$$

$$t1<Cb<t2$$

$$t1<Cr<t2$$

$$|Cb-Cr|<t\_cr\_diff$$

$$t\_Y=204$$

$$t1=120$$

$$t2=136$$

$$t\_cr\_diff=8 \qquad (3)$$

In Equation 3, "Y", "Cb", and "Cr" respectively denote Y, Cb, and Cr image data of a pixel in an input image. The "t_Y" is a reference of the Y image data to correspond to the highlight area, and is adjustable. The "t1" denotes a reference of a lower limit of Cb and Cr image data ranges to correspond to the highlight area, and is adjustable. The "t2" denotes a reference of an upper limit of Cb and Cr image data ranges to correspond to the highlight area, and is adjustable. The "t_cr_diff" is a reference of differences between the Cr and Cb image data to correspond to the highlight area, and is adjustable.

Also, the highlight area obtaining unit 73b-3 may further include a highlight segment pixel and surrounding pixel comparison unit 73b-32 for comparing a first difference in red image data between a first pixel of a start point or an end point of any one of the highlight horizontal segment and the highlight vertical segment, with a second difference in green image data or blue image data between the first pixel and the second pixel.

Highlight area has a remarkable bright difference from surrounding pixels. The R image data is large in a pupil where a red-eye effect occurs, but the G and B image data are relatively small. However, the R, G, and B image data are all high in the highlight area, which can be expressed by Equation 4.

$$S: r-ppr>t\_r,\ g-ppg>t\_g,\ b-ppb>t\_b$$

$$E: r-nnr>t\_r,\ g-nng>t\_g,\ b-nnb>t\_b$$

r, g, b: the value of brightness of each channel of currently processing pixel ppr, ppg, ppb: a pixel located two pixels before the current pixel ppr, ppg, ppb: a pixel located two pixels after the current pixel t_r: 16 t_g: 64 t_b: 48 (4)

In Equation 4, "t_r" is a threshold value of an image data difference of each of "ppr" and "nnr" and the current pixel such that the current pixel can be in the highlight area. "t_g" is a threshold value of an image data difference of each of "ppg" and "nng" and the current pixel such that the current pixel can be in the highlight area. "t_b" is a threshold value of an image data difference of each of "ppb" and "nnb" and the current pixel such that the current pixel can be in the highlight area.

The highlight area determination unit 73b-34 may determine that the at least one segment belongs to the highlight area when the first difference is smaller than the second difference. As another comparison method, the first difference may be compared with the first reference obtained from experiment and the second difference may be compared with the second reference that is predetermined. The first reference is smaller than the second reference.

The highlight area obtaining unit 73b-3 may further include a highlight segment size comparison unit 73b-33 for comparing a size of at least any one segment of the highlight horizontal segment and the highlight vertical segment with a reference segment size range.

The highlight segment size comparison unit 73b-33 may determine the highlight area because the highlight area is formed to be smaller than a particular size. For example, when a face located the closest to the highlight area is photographed, assuming that the horizontal length and vertical length of the whole input image respectively are W and H, the maximum size at one axis of highlight area may be limited as expressed by Equation 5, which is adjustable. When the length of the detected highlight horizontal segment or the detected highlight vertical segment is greater than the highlight size limit of Equation 5, the detected highlight horizontal segment or the detected highlight vertical segment may not constitute the highlight area.

Highlight Segment Size=MIN(W, H)÷K

K=150~200 (5)

In Equation 5, "K" is a ratio of the face size to the highlight size to obtain an available size of highlight to the face size.

The highlight area determination unit 73b-34 may determine that the at least any one segment belongs to the highlight area when the size of the at least any one segment corresponds to the reference segment range.

The eye area determination unit 73b-5 obtains the highlight area by labeling segments located close to the detected highlight segments. A point where the maximum horizontal axis and the maximum vertical axis meet in the labeled highlight area is set to be the center of the highlight area. An area from the center of the highlight area may be determined to be the eye area.

Then, the redness obtaining unit 73b-6 obtains the redness with respect to the determined eye area. The red-eye area obtaining unit 73b-7 may obtain the red-eye area by using the redness. The red-eye area obtaining unit 73b-7 is described above with reference to FIG. 4.

Figure 7:
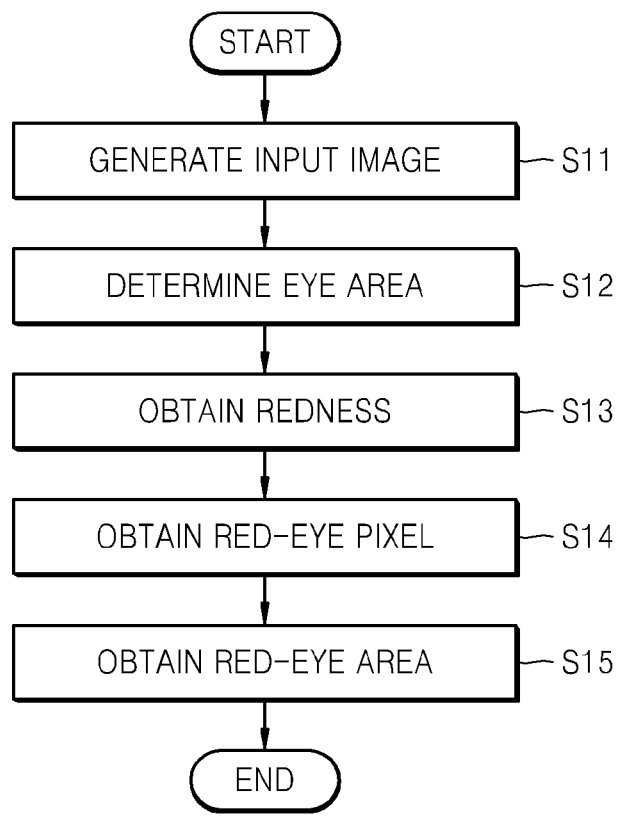
FIG. 7 is a flowchart for explaining a method of detecting a red eye according to an exemplary embodiment of the invention.

FIG. 7 is a flowchart for explaining a method of detecting a red eye according to an exemplary embodiment of the invention. Referring to FIG. 7, an input image is generated (S11). The input image may be an image obtained by photographing a man as an object, or a previously stored image including a man.

An eye area is determined from the input image (S12). In the determination of the eye area, an area including an eye that is recognized by the eye recognition algorithm may be determined as the eye area. Alternatively, the eye area may be determined by detecting a highlight area that is necessarily formed in a red-eye and determining an area including the detected highlight area as the eye area. The redness may be obtained with respect to a pixel of the eye area according to Equation 1 (S13).

Redness=$(r-b) \times (r-g) \times (r+b-g) / [(g+b) \times (g+b)+1]$ (1)

In Equation 1, "r", "g", and "b", respectively, denote R, G, B image data of pixels forming the input image.

Red-eye pixels, each having a reference redness corresponding to a red eye, are obtained (S14). A red-eye area including the obtained red-eye pixels is obtained (S15).

Figure 8:
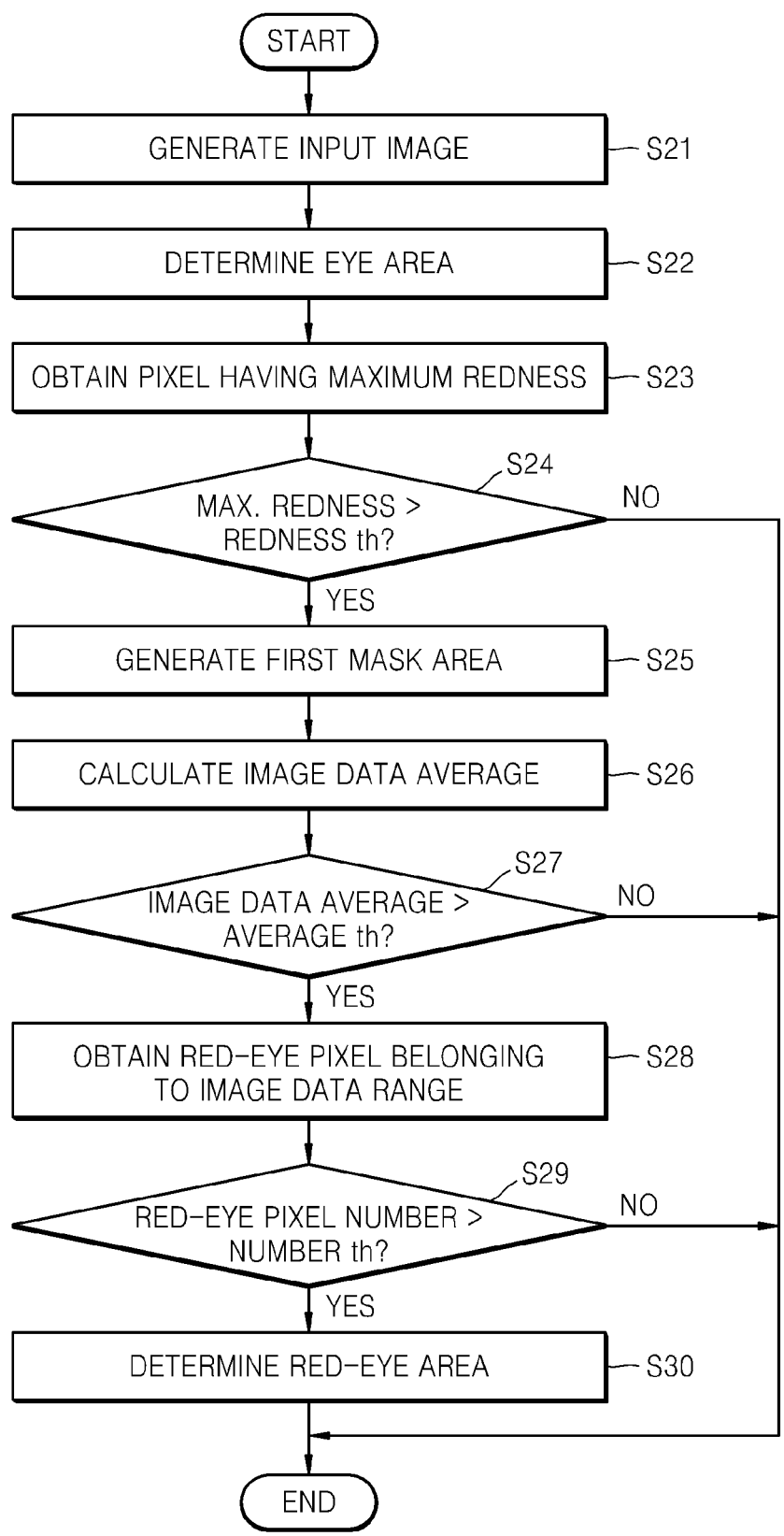
FIG. 8 is a flowchart for explaining a method of detecting a red eye according to another exemplary embodiment of the invention.

FIG. 8 is a flowchart for explaining a method of detecting a red eye according to another exemplary embodiment of the invention. Referring to FIG. 8, an input image is generated (S21). An eye area is determined from the input image (S22). A pixel having the maximum redness Max Redness is obtained from the eye area (S23).

It is determined whether the maximum redness is greater than a reference redness Redness th (S24). When the maximum redness is smaller than the reference redness that is a threshold redness corresponding to a red eye, it may be determined that no red-eye effect exists, or the detection of a red eye may be terminated.

When the maximum redness is greater than the reference redness, a first mask area having a size including a pixel having the maximum redness is generated in the eye area (S25). The first mask area may have a size of 3×3 or 5×5. The average of image data is calculated from the pixels in the first mask area (S26). It is determined whether the average of image data is greater than a reference average Average th (S27).

The average of brightness for each channel may be obtained from the pixels in the first mask area with respect to pixels having a certain amount of redness or greater. This is to exclude an area of highlight or iris from the first mask area. When the average of the R, G, and B image data is to be calculated, the average of the R image data, the average of the G image data, and the average of the B image data may be obtained.

When the image data average is smaller than the reference average Average th, it may be determined that no red-eye effect exists, or the detection of a red eye may be terminated. When the image data average is greater than the reference average, a red-eye pixel belonging to the image data range is detected (S28). A range of image data average±a may be set to be the image data range. The "a" is determined by experience and is adjustable.

The number of the obtained red-eye pixel is compared with a reference number Number th (S29). When the number of red-eye pixels is smaller than the reference number, it may be determined that no red-eye effect exists, or the detection of a red eye may be terminated. When the number of red-eye pixels is greater than the reference number, a red-eye area may be determined from the red-eye pixel (S30).

Figure 9:
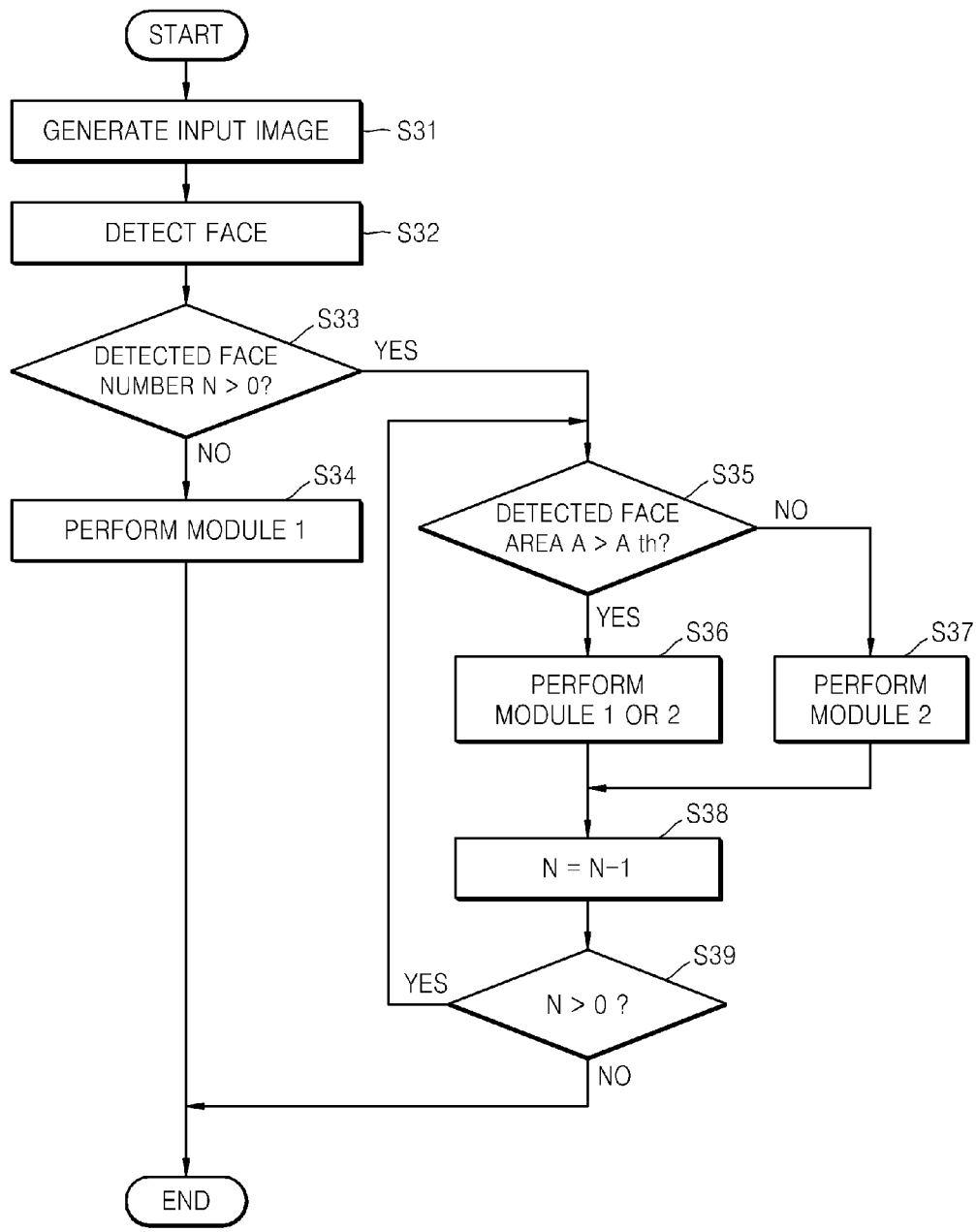
FIG. 9 is a flowchart for explaining a method of detecting a red eye according to another exemplary embodiment of the invention.

FIG. 9 is a flowchart for explaining a method of detecting a red eye according to another exemplary embodiment of the invention. Referring to FIG. 9, an input image is generated (S31). A face is detected from the input image by using a face recognition algorithm (S32). The number N of detected faces is determined (S33). When the number N of the detected faces is 0, that is, a face is not detected, a red eye is detected by a method of Module 1. When the number N of the detected faces is greater than 0, a detected face size A is compared with a reference size A th (S35).

When the detected face size is greater than the reference size, a red eye is detected by a method of Module 1 or 2 (S36). When the detected face size is smaller than the reference size, a red eye is detected by a method of Module 2 (S37).

The number of the detected faces is reduced by one (S38). That is, after a red-eye is detected from the detected face, it is determined whether the number of faces to detect a red eye is left (S39). If affirmative, the subsequent operations after S35 are performed. If not, the detection of a red eye is terminated.

Figure 10:
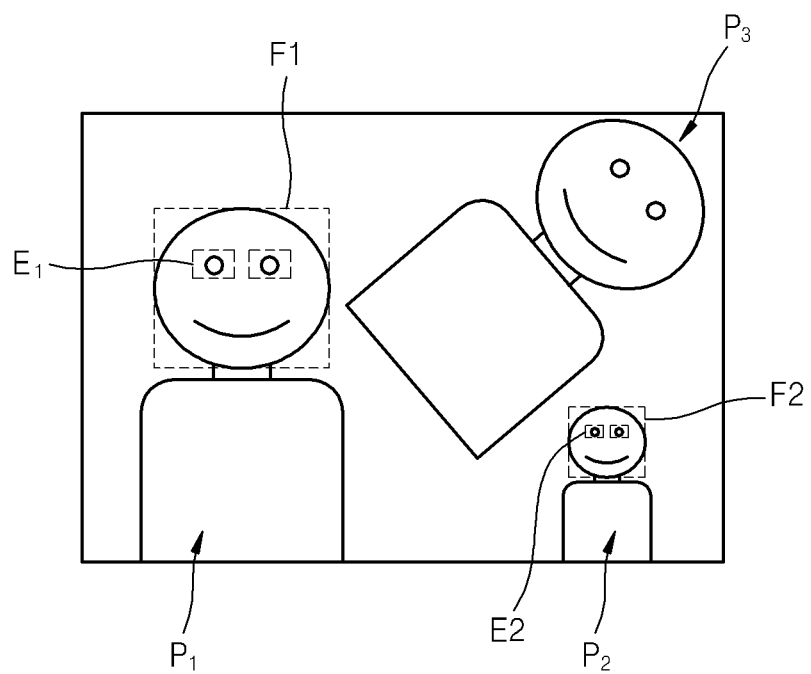
FIG. 10 is a pictorial diagram illustrating an example of an input image photographing a plurality of objects.

FIG. 10 illustrates an example of an input image including three objects. Referring to FIG. 10, in a first object P1, a face is detected and thus a face area F1 is formed. Also, an eye is detected from the face area F1 and thus an eye area E1 is formed. In a second object P2, a face is detected to form a face area F2 and an eye is detected from the face area to form an eye area E2. However, an image of the second object P2 is smaller than that of the first object P1. Also, the size of the face area F2 of the second object P2 is smaller than that of the face area F1 of the first object P1. The input image may include a third object P3 that the face recognition algorithm fails to detect.

Figure 11A:
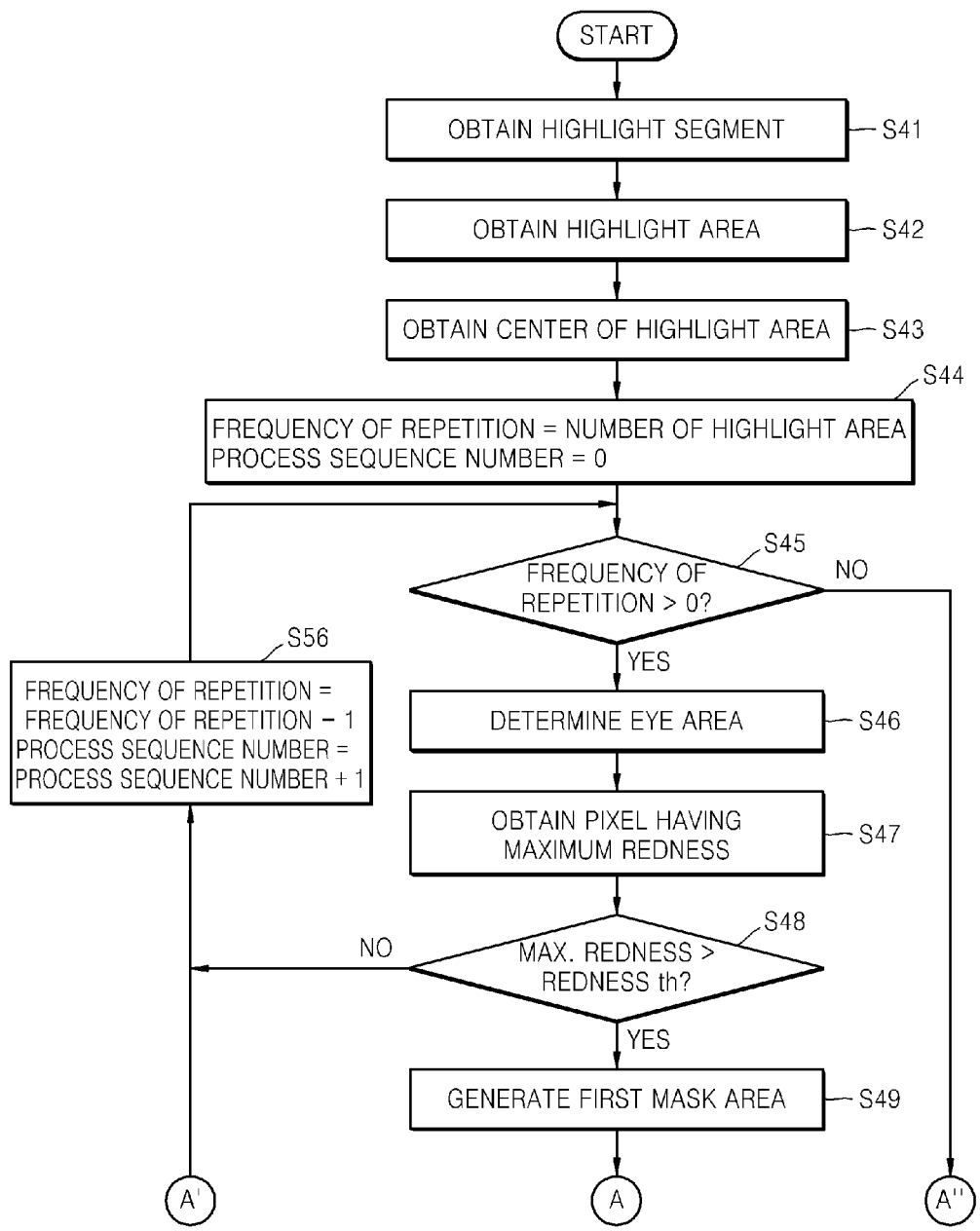
FIGS. 11A and 11B are a flowchart for explaining a method of Module 1 in the method of detecting a red eye of FIG. 9.
Figure 11B:
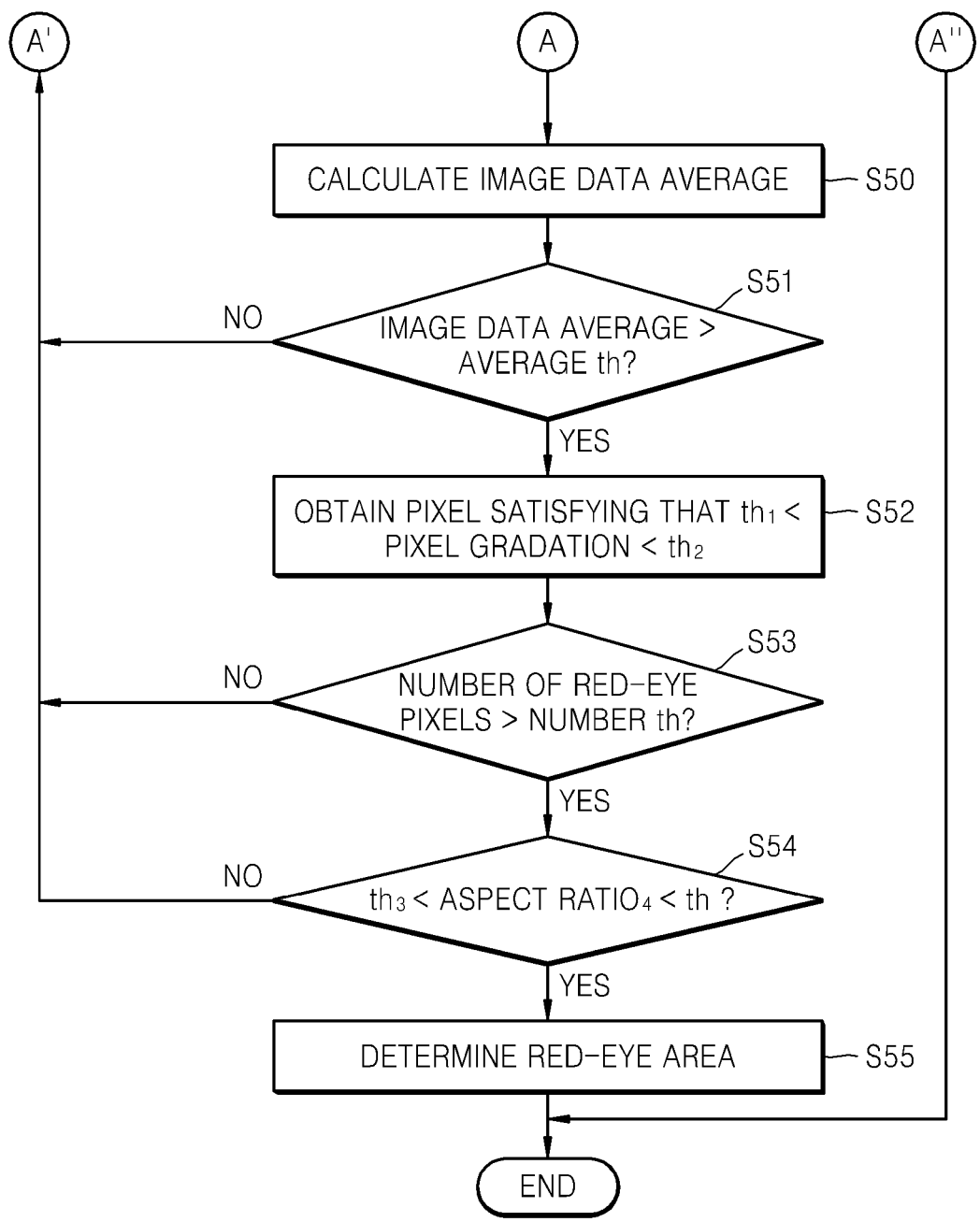

FIGS. 11A and 11B are a flowchart for explaining a method of Module 1 in the method of detecting a red eye of FIG. 9. Referring to FIG. 11A, first, when a face is not detected or the size of a face area is large, a highlight segment is obtained from the input image (S41).

Figure 12:
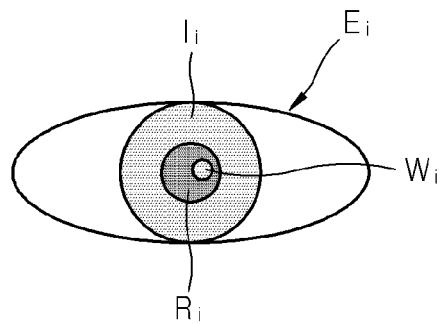
FIG. 12 is a pictorial diagram illustrating an example of an eye area where a red-eye effect occurs.

FIG. 12 illustrates an example of an eye area where a red-eye effect occurs. Referring to FIG. 12, a pupil area Ii, a red-eye area Ri, and a highlight area Wi are generated in an eye area Ei.

Figure 13A:
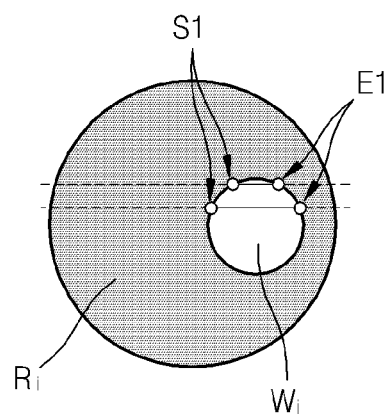
FIGS. 13A and 13B are pictorial diagrams that, respectively, illustrate a highlight horizontal segment and a highlight vertical segment in the eye area of FIG. 12.
Figure 13B:
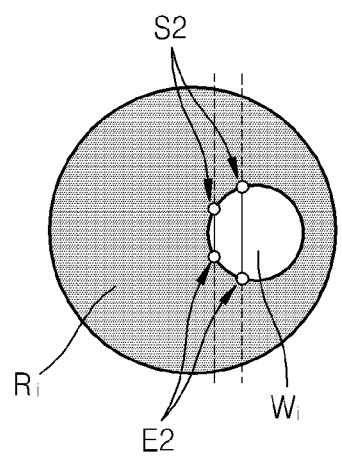

FIGS. 13A and 13B, respectively, illustrate a highlight horizontal segment and a highlight vertical segment in the eye area Ei of FIG. 12. Referring to FIG. 13A, a highlight horizontal segment indicating very bright white color may be obtained by scanning the eye area Ei along a horizontal axis. Accordingly, a highlight horizontal segment connecting a start point S1 and an end point E1 may be obtained. Referring to FIG. 13B, a highlight vertical segment connecting a start point S2 and an end point E2 may be obtained by scanning the eye area Ei along a vertical axis.

The highlight area is much brighter than the white of an eye. Equation 2 or 3 may be used as a conditional expression for the above highlight area. When the image data of each pixel is R, G, and B data, Equation 2 may be used. When the image data of each pixel is Y, Cb, and Cr data, Equation 3 may be used.

$$r+g+b>t\_rgb$$

$$|-r-g|+|g-b|+|r-b|<t\_diff$$

$$t\_rgb=612$$

$$t\_diff=96 \qquad (2)$$

In Equation 2, "r", "g", and "b" respectively denote R, G, and B image data of a pixel in an input image. The "t_rgb" is a reference of the sum of the R, G, and B image data to correspond to the highlight area. The "t_diff" is a reference of the sum of differences between the R, G, and B image data to correspond to the highlight area. The "t_rgb" and "t_diff" are adjustable values.

$$Y>t\_Y$$

$$t1<Cb<t2$$

$$t1<Cr<t2$$

$$|Cb-Cr|<t\_cr\_diff$$

$$t\_Y=204$$

$$t1=120$$

$$t2=136$$

$$t\_cr\_diff=8 \qquad (3)$$

In Equation 3, "Y", "Cb", and "Cr" respectively denote Y, Cb, and Cr image data of a pixel in an input image. The "t_Y" is a reference of the Y image data to correspond to the highlight area, and is adjustable. The "t1" denotes a reference of a lower limit of Cb and Cr image data ranges to correspond to the highlight area, and is adjustable. The "t2" denotes a reference of an upper limit of Cb and Cr image data ranges to correspond to the highlight area, and is adjustable. The "t_cr_diff" is a reference of differences between the Cr and Cb image data to correspond to the highlight area, and is adjustable.

Accordingly, the highlight area may be obtained by labeling the highlight segments formed as above (S42). To obtain the highlight area, at least one of the following operations may further be performed.

Highlight area has a remarkable bright difference from surrounding pixels. The R image data is large in a pupil where a red-eye effect occurs, but the G and B image data are relatively small. However, the R, G, and B image data are all high in the highlight area, which can be expressed by Equation 4.

$$S: r-ppr>t\_r, g-ppg>t\_g, b-ppb>t\_b$$

$$E: r-nnr>t\_r, g-nng>t\_g, b-nnb>t\_b$$

r, g, b: the value of brightness of each channel of currently processing pixel ppr, ppg, ppb: a pixel located two pixels before the current pixel ppr, ppg, ppb: a pixel located two pixels after the current pixel $$t\_r: 16$$

$$t\_g: 64$$

$$t\_b: 48 \qquad (4)$$

In Equation 4, "t_r" is a threshold value of an image data difference of each of "ppr" and "nnr" and the current pixel such that the current pixel can be in the highlight area. "t_g" is a threshold value of an image data difference of each of "ppg" and "nng" and the current pixel such that the current pixel can be in the highlight area. "t_b" is a threshold value of an image data difference of each of "ppb" and "nnb" and the current pixel such that the current pixel can be in the highlight area.

According to Equation 4, an area to which highlight extends may be detected by comparing the image data of the current pixel with the image data of the pixel located two pixels before the current pixel. The highlight segment satisfying the conditions of Equation 4 may be determined as an effective highlight segment.

Also, highlight is smaller than a particular size. When a face located the closest to the highlight area is photographed, assuming that the horizontal length and vertical length of the whole input image respectively are W and H, the maximum size at one axis of highlight area may be limited as expressed by Equation 5, which is adjustable. When the length of the detected highlight horizontal segment or the detected highlight vertical segment is greater than the highlight size limit of Equation 5, the detected highlight horizontal segment or the detected highlight vertical segment may not constitute the highlight area.

Highlight Segment Size=MIN($W$, $H$)÷$K$ $$K=150\sim200 \quad (5)$$

In Equation 5, "K" is a ratio of the face size to the highlight size to obtain an available size of highlight to the face size.

When the size of the at least one segment corresponds to the reference segment range, the at least one segment may be determined to be an effective highlight segment that belongs to the highlight area.

Figure 14:
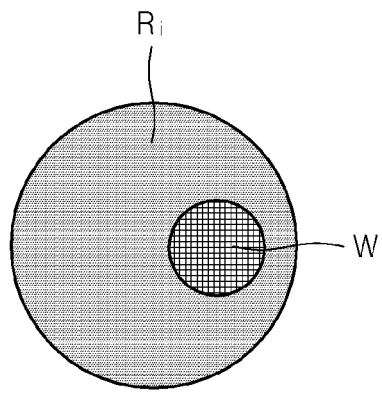
FIG. 14 is a pictorial diagram illustrating a highlight area in the eye area of FIG. 12, according to an exemplary embodiment of the invention.

The highlight area is obtained by labeling segments located close to the detected highlight segments (S42). As an example, a highlight area W may be obtained as in FIG. 14. A point where the maximum horizontal axis and the maximum vertical axis meet in the labeled highlight area is set to be the center of the highlight area W (S43).

The frequency of repetition is set to the number of the highlight area and the process sequence number is set to be 0 (S44). It is determined whether the frequency of repetition is greater than 0 (S45). When the frequency of repetition is greater than 0, an area from the center of the highlight area W may be determined as the eye area A, as in FIG. 15 (S46). When the frequency of repetition is 0, that is, the number of highlight areas is 0, it is determined that no red-eye is detected, or the detection of a red eye may be terminated.

Figure 15:
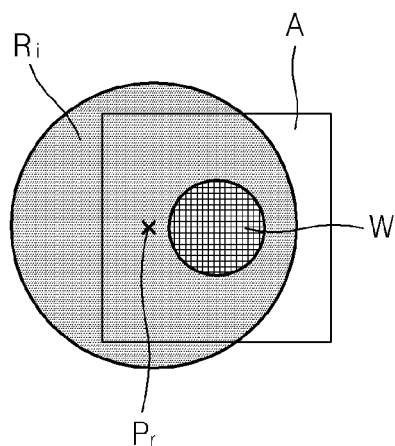
FIG. 15 is a pictorial diagram illustrating a surrounding area including the highlight area in the eye area of FIG. 12, according to an exemplary embodiment of the invention.

FIG. 15 illustrates a surrounding area including the highlight area in the eye area Ei of FIG. 12, according to an exemplary embodiment of the invention; Referring to FIG. 15, a pixel Pr having the maximum redness is obtained from the eye area A. The redness may be obtained by the method according to Equation 1 which has improved reliability in detecting a red eye generated in the eye area. When a variety of red colors are present in an input image, Equation 1 is reliable in selectively detecting red color corresponding to the red eye, other than dark red color or light red color.

The maximum redness is compared with a reference redness that is a threshold value to detect a red eye (S48). Although the reference redness may be set to be 40-100, the invention is not limited thereto. When the maximum redness is smaller than the reference redness, the frequency of repetition is reduced by one (S56) and the process sequence number is increased by one so that the subsequent operations after the operation S45 may be performed. That is, with respect to the obtained highlight areas, the first highlight area is determined to have no red eye and the second highlight area is determined to have a red eye.

Figure 16:
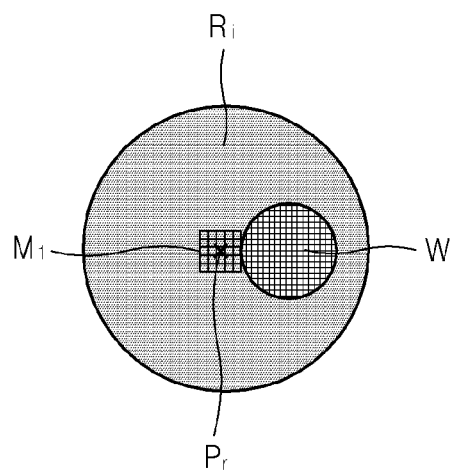
FIG. 16 is a pictorial diagram illustrating a first mask area including a pixel having the maximum redness in the eye area of FIG. 12, according to an exemplary embodiment of the invention.

When the maximum redness is greater than the reference redness, the first mask area having a certain size is generated in the pixel having the maximum redness (S49). Referring to FIG. 16, a first mask M1 may be formed around the pixel.

Referring to FIG. 11B, to exclude the highlight or iris, pixels having a redness of over a predetermined size are obtained from the pixels in the first mask area, and the image data average is calculated with respect to the obtained pixels (S50). The image data average may be calculated by each channel with respect to the pixels.

The image data average is compared with the reference average Average th that is a threshold value (S51). Although the reference average may be set to be 30-80, the invention is not limited thereto. When the image data average is smaller than the reference average, the frequency of repetition is reduced by one (S56) and the process sequence number is increased by one so that the subsequent operations after the operation S45 may be performed.

When the data average is greater than the reference average, a pixel corresponding to the range of image data to determine a red eye is obtained (S52). The range of image data may be determined to be the image data average±a. The range of image data may be that $th_1$<pixel gradation<$th_2$. The "$th_1$" or "$th_2$" may be adjustable according to preference.

Figure 17:
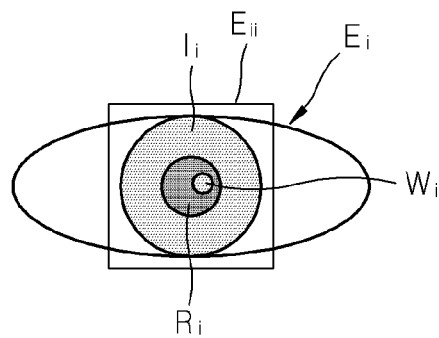
FIG. 17 is a pictorial diagram illustrating an area in which red-eye pixels corresponding to the average of image data are detected, in the eye area of FIG. 12, according to an exemplary embodiment of the invention.

FIG. 17 illustrates an area in which red-eye pixels corresponding to the average of image data are detected, in the eye area Ei of FIG. 12, according to an exemplary embodiment of the invention. Referring to FIG. 17, red-eye pixels corresponding to the average range of image data are obtained from an area Eii including pixels having the maximum redness.

The number of the obtained red-eye pixels and the reference number Number th are compared with each other (S53). When the number of the obtained red-eye pixels is smaller than the reference number Number th, the frequency of repetition is reduced by one (S56) and the process sequence number is increased by one so that the subsequent operations after the operation S45 may be performed. When the number of the obtained red-eye pixels is greater than the reference number Number th, the red-eye area including the detected red-eye pixels is obtained. The embodiment ratio of the red-eye area is obtained and it is determined whether the embodiment ratio corresponds to the range of $th_3$-$th_4$ (S54). The embodiment ratio is a ratio of the maximum vertical axis to the maximum horizontal axis in the red-eye area. Although "$th_3$" and "$th_4$" may be set to be 0.4-0.7 and 1.2-1.7, respectively, the invention is not limited thereto. When the embodiment ratio corresponds to the range of $th_3$-$th_4$, the subsequent operations are performed with respect to the red-eye area. When the embodiment ratio does not correspond to the range of $th_3$-$th_4$, the frequency of repetition is reduced by one (S56) and the process sequence number is increased by one so that the subsequent operations after the operation S45 may be performed.

Figure 18:
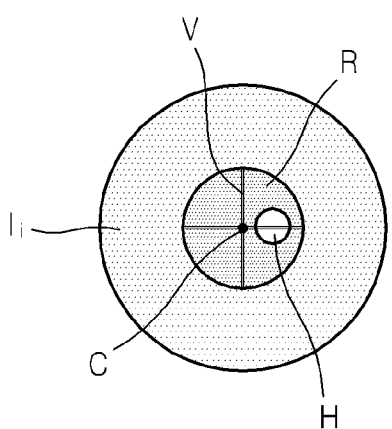
FIG. 18 is a pictorial diagram illustrating a second mask area including red-eye pixels in the eye area of FIG. 12, according to an exemplary embodiment of the invention.
Figure 19A:
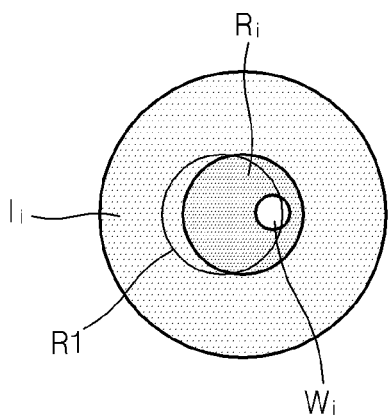
FIGS. 19A-19E are pictorial diagrams illustrating the operations of obtaining a red-eye area by using the second mask area, according to an exemplary embodiment of the invention.
Figure 19B:
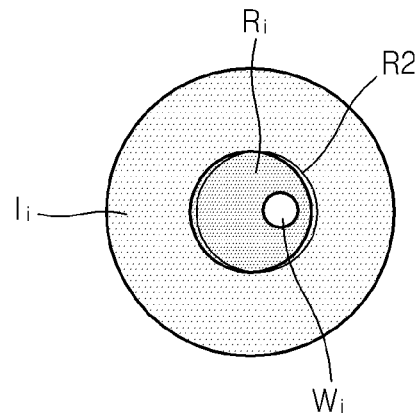
Figure 19C:
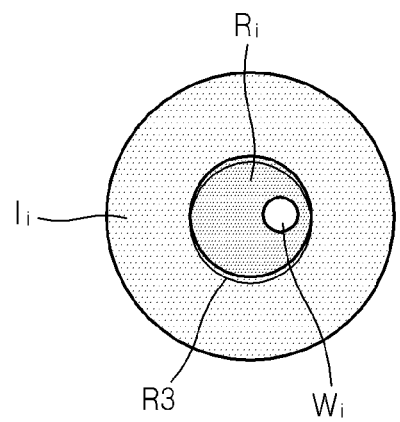
Figure 19D:
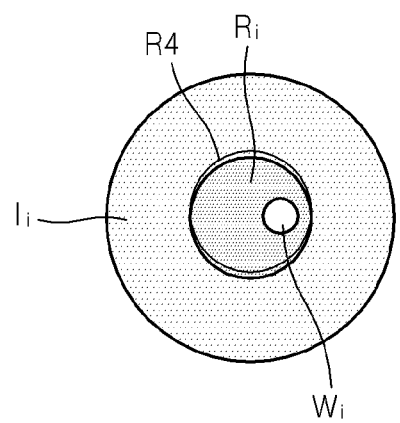
Figure 19E:
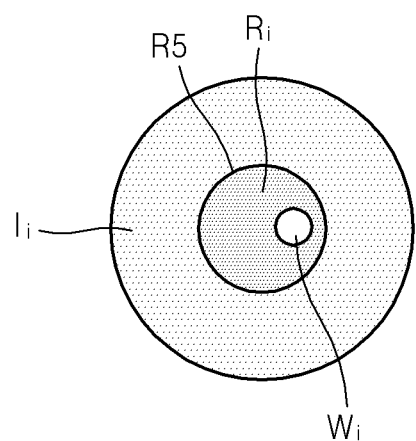

FIG. 18 illustrates a second mask area including red-eye pixels in the eye area Ei of FIG. 12, according to an exemplary embodiment of the invention. Referring to FIG. 18, a longer segment of the maximum horizontal axis H and the maximum vertical axis V in the red-eye area R is set to be a diameter of the red-eye area. A point where the maximum horizontal axis H and the maximum vertical axis V meet is determined as a temporary center C of the red-eye area R.

FIGS. 19A-19E illustrate the operations to obtain a red-eye area by using the second mask area, according to an exemplary embodiment of the invention. Referring to FIGS. 19A-19E, by moving the temporary center C of the red-eye area R by a predetermined amount, a temporary center having the highest redness average of the pixels in any one of circular areas R1, R2, R3, R4, and R5 having the same diameter as that of the red-eye area is determined to be a final center of the red-eye area, and the half of the diameter of the red-eye area is determined to be the radius of the red-eye area, so that the red-eye area may be determined.

According to the present exemplary embodiment, when no face detection algorithm and eye detection algorithm exists, or the face and/or eye is not detected using the algorithm, highlight around a pupil reflecting flash light is detected quickly and accurately. Also, the red eye around the highlight may be effectively detected.

Figure 20A:
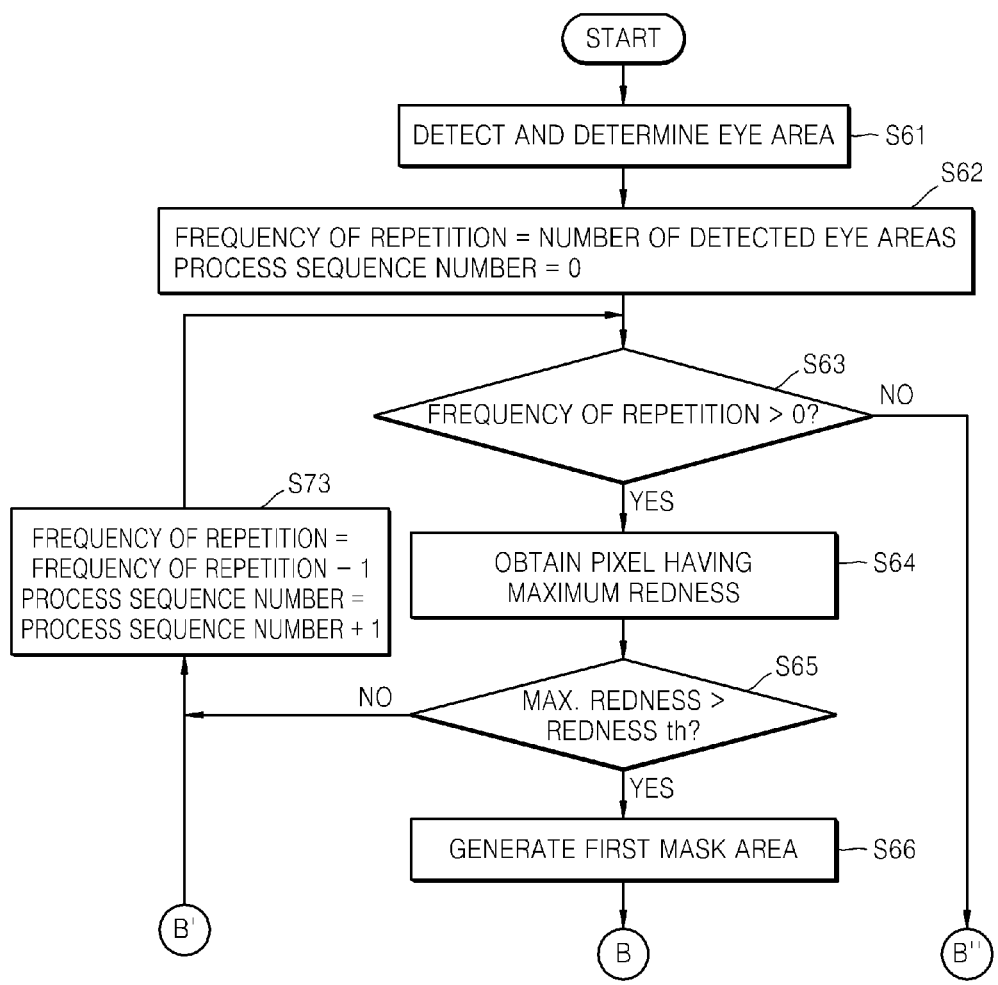
FIGS. 20A and 20B, respectively, are a flowchart for explaining a method of Module 2 in the method of detecting a red eye of FIG. 9.
Figure 20B:
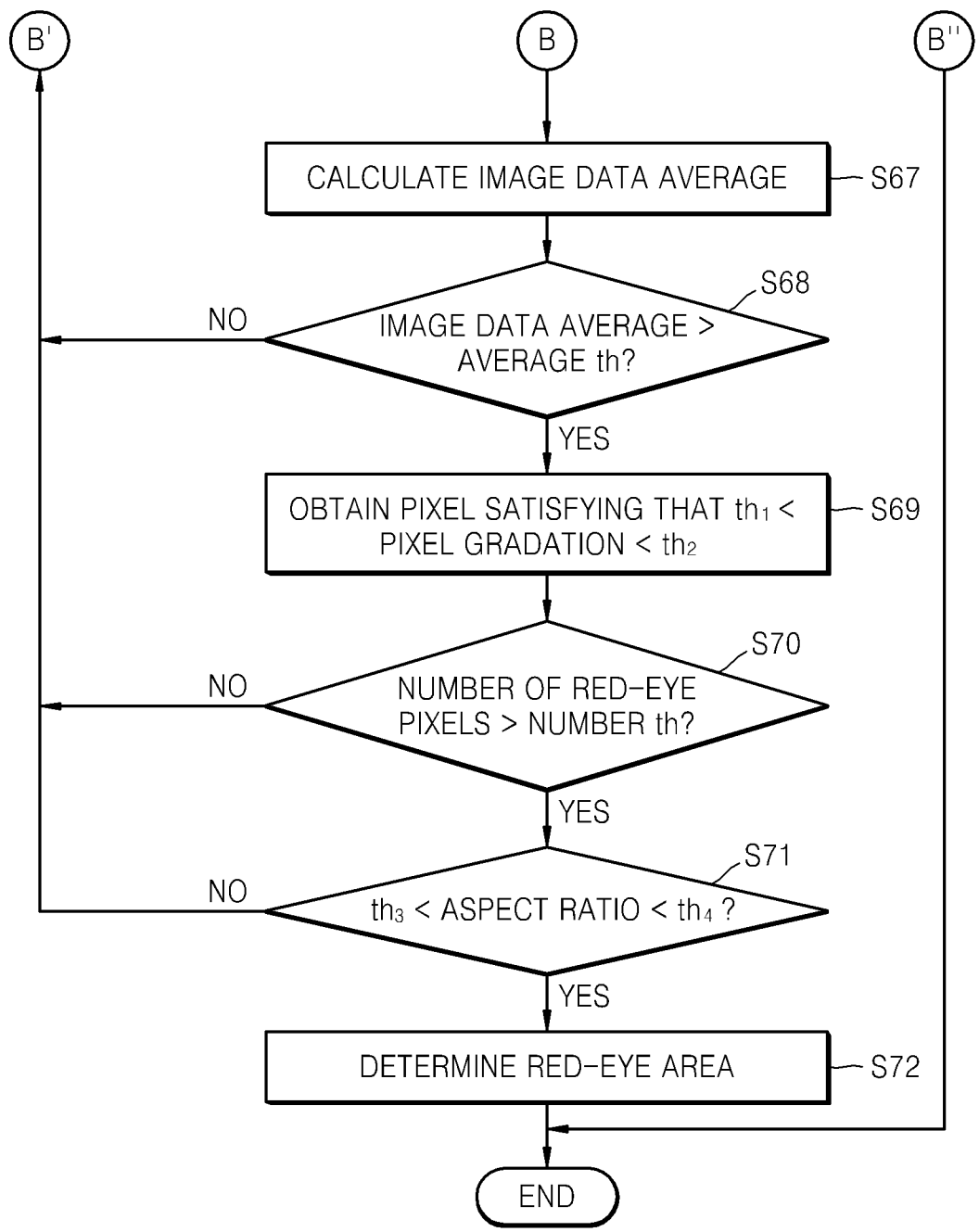

FIGS. 20A and 20B, respectively, are a flowchart for explaining a method of Module 2 in the method of detecting a red eye of FIG. 9. Referring to FIG. 20A, an eye is detected with respect to the face area detected by using the eye recognition algorithm, and an area including the detected eye is determined to be an eye area (S61).

First, referring to FIG. 20a, an eye is detected with respect to the face area detected by using the eye recognition algorithm, and an area including the detected eye is determined as the eye area (S61). The frequency of repetition is the number of the determined eye area, and the process sequence number starts from 0 (S62).

It is determined whether the frequency of repetition is greater than 0 (S63). When the frequency of repetition is greater than 0, the pixel having the maximum redness is obtained from the eye area (S64). The redness may be obtained by the method according to Equation 1 which has improved reliability in detecting a red eye generated in the eye area. When a variety of red colors are present in an input image, Equation 1 is reliable in selectively detecting red color corresponding to the red eye, other than dark red color or light red color.

The subsequent operations after the pixel having the maximum redness is obtained may be performed similarly to the operations after the operation S48 of FIGS. 11A and 11B. In detail, the maximum redness is compared with a reference redness Redness th that is a threshold value to detect a red eye (S65). Although the reference redness may be set to be 40-100, the invention is not limited thereto. When the maximum redness is smaller than the reference redness, the frequency of repetition is reduced by one and the process sequence number is increased by one (S73) so that the subsequent operations after the operation S63 are performed. That is, it is determined that no red eye is obtained in the first eye area of the determined eye areas. For other second eye area, the operations for detecting a red eye are performed. When the maximum redness is greater than the reference redness, a first mask area having a certain size is generated in the pixels having the maximum redness (S66).

Referring to FIG. 20B, to exclude the highlight or iris, pixels having a redness of over a predetermined size are obtained from the pixels in the first mask area, and the image data average is calculated with respect to the obtained pixels (S67). The image data average may be calculated by each channel with respect to the pixels.

The image data average is compared with the reference average Average th to determine whether it is a threshold value (S68). Although the reference average may be set to be 30-80, the invention is not limited thereto. When the image data average is smaller than the reference average Average th, the frequency of repetition is reduced by one and the process sequence number is increased by one (S73) so that the subsequent operations after the operation S63 may be performed.

When the data average is greater than the reference average, a pixel corresponding to the range of image data to determine a red eye is obtained (S69). The range of image data may be determined to be the image data average±a. The range of image data may be that $th_1$<pixel gradation<$th_2$. The "$th_1$" or "$th_2$" may be adjustable according to experiment.

The number of the obtained red-eye pixels and the reference number Number th are compared with each other (S70). When the number of the obtained red-eye pixels is smaller than the reference number Number th, the frequency of repetition is reduced by one and the process sequence number is increased by one (S73) so that the subsequent operations after the operation S63 may be performed. When the number of the obtained red-eye pixels is greater than the reference number Number th, the red-eye area including the detected red-eye pixels is obtained. The embodiment ratio of the red-eye area is obtained and it is determined whether the embodiment ratio corresponds to the range of $th_3$-$th_4$ (S71). The embodiment ratio is a ratio of the maximum vertical axis to the maximum horizontal axis in the red-eye area. Although "$th_3$" and "$th_4$" may be set to be 0.4-0.7 and 1.2-1.7, respectively, the invention is not limited thereto. When the embodiment ratio corresponds to the range of $th_3$-$th_4$, the subsequent operations are performed with respect to the red-eye area. When the embodiment ratio does not correspond to the range of $th_3$-$th_4$, the frequency of repetition is reduced by one and the process sequence number is increased by one (S73) so that the subsequent operations after the operation S63 may be performed.

A longer segment of the maximum horizontal axis and the maximum vertical axis in the red-eye area is set to be a diameter of the red-eye area. A point where the maximum horizontal axis and the maximum vertical axis meet is determined as a temporary center of the red-eye area.

By moving the temporary center of the red-eye area by a predetermined amount, a temporary center having the highest redness average of the pixels in any one of circular areas having the same diameter as that of the red-eye area is determined to be a final center of the red-eye area, and the half of the diameter of the red-eye area is determined to be the radius of the red-eye area, so that the red-eye area may be finally determined (S72).

According to the present exemplary embodiment, when a face detection algorithm and an eye detection algorithm are provided, a red eye may be effectively detected by using the algorithms. Accordingly, a red eye may be quickly and accurately detected.

The method for detecting a red eye according to the above-described exemplary embodiment of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the invention can be easily construed by programmers skilled in the art to which the invention pertains.

Although preferably implemented using an imaging device, the system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of detecting a red eye, the method comprising:
determining an eye area from an input image;
obtaining a pixel having a maximum redness from the eye area;
generating a first mask area having a predetermined size including the pixel from the eye area;
obtaining an average of image data from pixels in the first mask area;
obtaining red-eye pixels corresponding to the image data average from the eye area; and
determining a red-eye area by using the red-eye pixels.

2. The method of claim 1, further comprising:
generating a second mask area including the red-eye pixels; and
determining the second mask area in which the average of the redness of the pixels in the second mask area is a maximum, as a red-eye area, by moving the second mask.

3. The method of claim 1, further comprising:
comparing the maximum redness with a reference redness; and
determining that no red-eye area exists when the maximum redness is smaller than the reference redness,
wherein, when the maximum redness is smaller than the reference redness, the method further comprising obtaining a pixel having the maximum redness from the eye area.

4. The method of claim 1, wherein the redness is obtained by using Equation 1, $$\text{Redness}=(r-b)\times(r-g)\times(r+b-g)/[(g+b)\times(g+b)+1], \quad (1)$$

in which "r", "g", and "b", respectively, denote R, G, B image data of pixels.

5. The method of claim 1, further comprising detecting a face area with respect to the input image.

6. The method of claim 5, further comprising detecting an eye area when the face area is detected.

7. The method of claim 6, further comprising:
comparing a size of the detected face area with a reference size;
detecting an eye area when the size of the detected face area is smaller than the reference area size; and
obtaining a highlight area when the size of the detected face area is greater than the reference area size, and determining an area including the highlight area as an eye area.

8. The method of claim 5, further comprising:
obtaining a highlight area when the face area is not detected; and
determining an area including the highlight area as an eye area.

9. The method of claim 7, wherein the obtaining of the highlight area comprises:
obtaining a highlight horizontal segment and a highlight vertical segment; and
obtaining the highlight area including the highlight horizontal segment and the highlight vertical segment.

10. The method of claim 9, further comprising:

obtaining a difference in image data between a first pixel that is a start point or an end point of at least any one segment of the highlight horizontal segment and the highlight vertical segment and a second pixel located two pixels before the first pixel in a scanning direction from the first pixel;

comparing a difference in red image data between the first pixel and the second pixel with a difference in green image data between the first pixel and the second pixel or blue image data between the first pixel and the second pixel; and determining that the at least one segment belongs to the highlight area when the difference in the red image data is smaller than the difference in the green image data or the blue image data.

11. The method of claim 10, further comprising:

comparing a size of at least one segment of the highlight horizontal segment and the highlight vertical segment with a reference segment size range; and determining that the at least one segment belongs to the highlight area when the size of the at least one segment corresponds to the reference segment range.

12. A method of detecting a red eye, the method comprising:

determining an eye area from an input image;

obtaining redness by using Equation 1 with respect to a pixel of the eye area, $$\text{Redness}=(r-b)\times(r-g)\times(r+b-g)/[(g+b)\times(g+b)+1], \qquad (1)$$

in which "r", "g", and "b", respectively, denote R, G, B image data of pixels;

obtaining red-eye pixels corresponding to a reference redness from the eye area; and obtaining a red-eye area by using the red-eye pixels.

13. The method of claim 12, further comprising:

obtaining a highlight area from the input image; and determining an area including the highlight area as an eye area.

14. The method of claim 13, wherein the obtaining of the highlight area comprises:

obtaining a highlight horizontal segment and a highlight vertical segment; and obtaining the highlight area including the highlight horizontal segment and the highlight vertical segment.

15. The method of claim 14, further comprising:

obtaining a difference in image data between a first pixel that is a start point or an end point of at least any one segment of the highlight horizontal segment and the highlight vertical segment and a second pixel located two pixels before the first pixel in a scanning direction from the first pixel;

comparing a difference in red image data between the first pixel and the second pixel with a difference in green image data between the first pixel and the second pixel or blue image data between the first pixel and the second pixel; and determining that the at least one segment belongs to the highlight area when the difference in the red image data is smaller than the difference in the green image data or the blue image data.

16. The method of claim 15, further comprising:

comparing a size of at least one segment of the highlight horizontal segment and the highlight vertical segment with a reference segment size range; and determining that the at least one segment belongs to the highlight area when the size of the at least one segment corresponds to the reference segment size range.

17. An apparatus for detecting a red eye, the apparatus comprising:

an eye determination unit for determining an eye area from an input image;

a redness obtaining unit for obtaining redness by using Equation 1 with respect to a pixel of the eye area, $$\text{Redness}=(r-b)\times(r-g)\times(r+b-g)/[(g+b)\times(g+b)+1], \qquad (1)$$

in which "r", "g", and "b", respectively, denote R, G, B image data of the pixel;

a red-eye area obtaining unit for obtaining a red-eye area including red-eye pixels corresponding to a reference redness from the eye area.

18. The apparatus of claim 17, further comprising:

a highlight area obtaining unit for obtaining a highlight area from the input area, wherein the eye area determination unit determines an area including the highlight area as an eye area.

19. The apparatus of claim 18, wherein the highlight area obtaining unit comprises:

a highlight segment obtaining unit for obtaining a highlight horizontal segment and a highlight vertical segment; and a highlight area determination unit for obtaining the highlight area including the highlight horizontal segment and the highlight vertical segment.

20. The apparatus of claim 19, wherein:

the highlight area obtaining unit further comprises a highlight segment pixel and surrounding pixel comparison unit for comparing a difference in red image data between a first pixel that is a start point or an end point of at least any one segment of the highlight horizontal segment and the highlight vertical segment and a second pixel located two pixels before the first pixel in a scanning direction from the first pixel, with a difference in green image data between the first pixel and the second pixel or blue image data between the first pixel and the second pixel, and the highlight area determination unit determines that the at least one segment belongs to the highlight area when the difference in the red image data is smaller than the difference in the green image data or the blue image data.

21. The apparatus of claim 20, wherein the highlight area obtaining unit further comprises a highlight segment size comparison unit for comparing a size of at least one segment of the highlight horizontal segment and the highlight vertical segment with a reference segment size range; and the highlight area determination unit determines that the at least one segment belongs to the highlight area when the size of the at least one segment corresponds to the reference segment size range.

22. An apparatus for detecting a red eye, the apparatus comprising:

an eye area determination unit for determining an eye area from an input image;

a maximum redness pixel obtaining unit for obtaining a pixel having a maximum redness from the eye area;

a first mask area generation unit for generating a first mask area having a predetermined size including the pixel from the eye area;

an image data average obtaining unit for obtaining an average of image data from pixels in the first mask area;

a red-eye pixel obtaining unit for obtaining a red-eye pixel corresponding to the image data average from the eye area; and a red-eye area determination unit for determining a red-eye area by using the red-eye pixel.

23. The apparatus of claim 22, wherein the red-eye area determination unit comprises:
a second mask area generation unit for generating a second mask area including the red-eye pixels;
a redness average calculation unit for calculating an average of redness of pixels in the second mask area by moving the second mask area; and
a red-eye area deciding unit for deciding the second mask area having the highest average as a red-eye area.

24. The apparatus of claim 22, further comprising:
a redness comparison unit for comparing the maximum redness with a reference redness; and
a redness determination unit for determining that no red-eye area exists when the maximum redness is smaller than the reference redness,
wherein the maximum redness pixel obtaining unit obtains a pixel having the maximum redness in the eye area when the maximum redness is greater than the reference redness.

25. The apparatus of claim 22, wherein the redness is obtained by Equation 1, $$\text{Redness} = (r-b) \times (r-g) \times (r+b-g)/[(g+b) \times (g+b)+1], \quad (1)$$

in which "r", "g", and "b", respectively, denote R, G, B image data of the pixel.

26. The apparatus of claim 22, further comprising a face area detection unit for detecting a face area with respect to the input image.

27. The apparatus of claim 26, further comprising an eye area detection unit for detecting an eye area from the face area.

28. The apparatus of claim 27, further comprising:
a face area comparison/determination unit for comparing a size of a detected face area with a reference size, wherein the eye area detection unit detects an eye area when the size of the detected face area is smaller than the reference size, and determines the eye area according to a result of the detection by the eye area determination unit, and
a highlight area obtaining unit for obtaining a highlight area when the size of the detected face area is greater than the reference size,
wherein the eye area determination unit determines that an area including the highlight area as an eye area.

29. The apparatus of claim 26, when the face area detection unit fails to detect the face area, further comprising a highlight area obtaining unit for obtaining a highlight area, wherein the eye area determination unit determines an area including the highlight area as an eye area.

30. The apparatus of claim 28, wherein the highlight area obtaining unit comprises:
a highlight segment obtaining unit for obtaining a highlight horizontal segment and a highlight vertical segment; and
a highlight area determination unit for determining a highlight area including the highlight horizontal segment and the highlight vertical segment.

31. The apparatus of claim 30, wherein the highlight area obtaining unit further comprises a highlight segment pixel and surrounding pixel comparison unit for comparing a difference in red image data between a first pixel that is a start point or an end point of at least any one segment of the highlight horizontal segment and the highlight vertical segment and a second pixel located two pixels before the first pixel in a scanning direction from the first pixel, with a difference in green image data between the first pixel and the second pixel or blue image data between the first pixel and the second pixel, and
the highlight area determination unit determines that the at least one segment belongs to the highlight area when the difference in the red image data is smaller than the difference in the green image data or the blue image data.

32. The apparatus of claim 31, wherein the highlight area obtaining unit further comprises a highlight segment size comparison unit for comparing a size of at least one segment of the highlight horizontal segment and the highlight vertical segment with a reference segment size range; and
the highlight area determination unit determines that the at least one segment belongs to the highlight area when the size of the at least one segment corresponds to the reference segment size range.

\* \* \* \* \*